(12) United States Patent
Preston

(10) Patent No.: US 7,302,340 B2
(45) Date of Patent: Nov. 27, 2007

(54) HIGH ALTITUDE PARACHUTE NAVIGATION FLIGHT COMPUTER

(75) Inventor: Daniel Preston, Kew Gardens, NY (US)

(73) Assignee: Atair Aerospace, Inc., Brooklyn, NY (US)

( * ) Notice: Subject to any disclaimer, the term of this patent is extended or adjusted under 35 U.S.C. 154(b) by 332 days.

(21) Appl. No.: 10/914,643

(22) Filed: Aug. 9, 2004

(65) Prior Publication Data

US 2007/0233382 A1    Oct. 4, 2007

Related U.S. Application Data

(60) Provisional application No. 60/493,366, filed on Aug. 8, 2003.

(51) Int. Cl.
  *G01C 21/00* (2006.01)
  *B64D 17/34* (2006.01)
(52) U.S. Cl. .............. 701/200; 701/208; 244/138 R; 244/142; 244/152
(58) Field of Classification Search ........ 701/200–202, 701/207–209, 211, 213, 1, 3–5, 14; 342/357.06, 342/257.12; 340/988; 345/7–9; 244/138 R, 244/142, 144, 152
See application file for complete search history.

(56) References Cited

U.S. PATENT DOCUMENTS

| 5,082,207 | A | * | 1/1992 | Tulinius | .................... | 244/76 R |
| 5,798,733 | A | | 8/1998 | Ethridge | ..................... | 342/357 |
| 5,807,109 | A | * | 9/1998 | Tzidon et al. | ................ | 434/35 |
| 6,863,241 | B2 | * | 3/2005 | Sash | ....................... | 244/17.25 |

OTHER PUBLICATIONS

Helmet-Mounted Display Targeting Symbology Color Coding: An Air-To-Air Scenario Evaluation, by Eric E. Geiselman and David L. Post, no specific date.*

\* cited by examiner

*Primary Examiner*—Yonel Beaulieu
(74) *Attorney, Agent, or Firm*—Bourque & Associates

(57) ABSTRACT

A navigational computer design for high altitude and other similar navigational needs includes a processor, which receives as input signals from navigational and navigational related sensors such as a GPS, compass, inertial measurement unit and sensors. Processor utilizes the navigational information to provide a display to the user indicating present navigational positional information as well is providing a flight path to follow to the target. The navigational computer includes a device that enables it to operate in a peer-to-peer network with other similar navigational computers such that during use, users may track one another. Once on the ground, the navigational computer may be used to continue navigation.

15 Claims, 5 Drawing Sheets ly during zero or near-zero visibility situations (e.g., adverse weather conditions such as cloud cover, rain, snow, fog, and darkness), thereby greatly reducing the possibility of detection. What is also needed is a system and method that adds peer-to-peer networking capability between such individual units in systems, thereby creating a system whereby individual team members may see each others location throughout flight and after landing.

HIGH ALTITUDE PARACHUTE NAVIGATION FLIGHT COMPUTER

RELATED APPLICATION AND PRIORITY CLAIM

This application claims priority from U.S. provisional patent application No. 60/493,366 filed Aug. 8, 2003 and incorporated fully herein by reference.

FIELD OF THE INVENTION

The present invention relates to navigation computers and more particularly, to a navigation computer for a parachute jump at high altitude.

DISCUSSION OF RELATED ART

Navigation computers have long been used for parachute jumps. The computer may provide the parachutist with information regarding the status of the jump, such as altitude and distance to target, as well as information required for the parachutist to reach the target. For military purposes, high altitude/high opening (HA/HO) jumps are used for insertion of elite troops into enemy or friendly territory. In such a jump, troops leap from aircraft at extremely high altitudes, above 30,000 ft, to reduce the chance of aircraft detection or attack. The team requires oxygen and special equipment for such a jump. The parachutes are opened shortly after jumping, and the team performs a series of navigational turns to remain on a proper course to arrive on target. Given the significant flight times from the high altitude, a number of navigational changes must be made to arrive as close as possible to the target. Currently, teams have little ability to navigate to a target unless it can be seen upon exit from the aircraft or during descent.

Furthermore, the navigational changes, including changes in altitude, must be coordinated between members of the team. During such jumps, the team must stay together as much as possible. It is desirable for the team to fly together in a close formation. During their dissent, however, the team must stay far enough apart so as to avoid a collision. The team must make complicated maneuvers to control speed, direction, and member spacing, and to arrive at the desired target site.

While a navigational computer could aid jumpers in HA/HO jumps, known navigation computers are inappropriate for such conditions. Given the equipment carried by the troops, and the need to control the parachute, operation of one or more buttons or controls of a navigation computer is difficult since the prior art devices were generally worn on the stomach of the jumper. At high altitude, think gloves necessary are necessary because temperatures can reach −58 F. Unfortunately, these thick gloves make operating buttons problematic and viewing a belly-mounted device is problematic due to required oxygen masks. Additionally, jumpers often carry cargo that is attached off a tether to their chest harness. The teathers can interfere with a belly mounted unit. Furthermore, known navigational computers cannot operate at the extreme temperatures or altitudes of HA/HO jumps. Also, known navigational computers do not allow for coordinated operations between members of a jump team. Finally, the navigational computer only operates while the jumper is descending. It becomes useless, and is simply excess weight, once the jumper is on the ground.

Accordingly, what is needed is a system and makes it possible to navigate in close formation and at high altitude

SUMMARY OF THE INVENTION

It is important to note that the present invention is not intended to be limited to a device or method which must satisfy one or more of any stated or implied objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
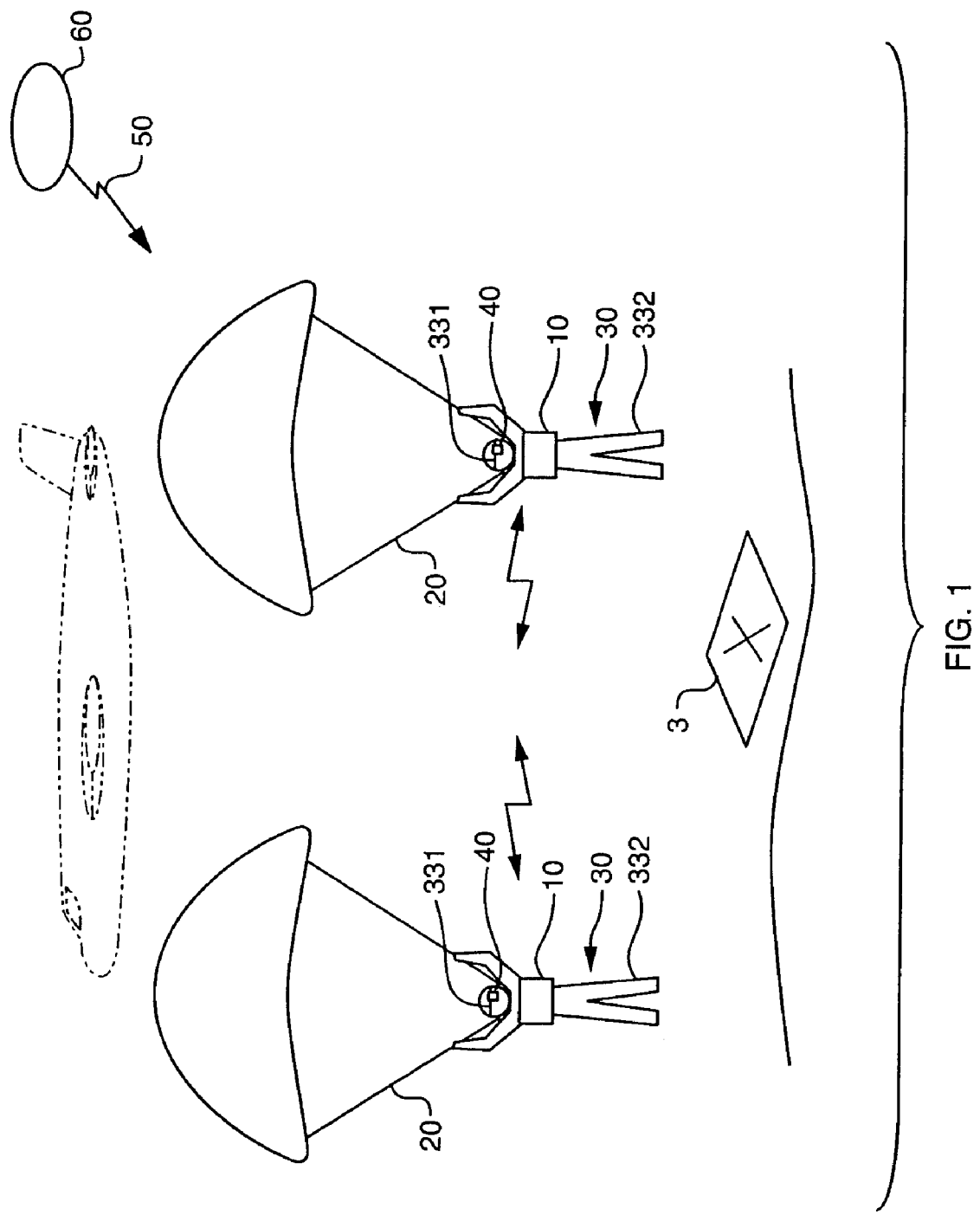
FIG. 1 is an oblique view of a navigational computer according to an embodiment of the present invention attached to a jumping harness.

The present invention features a navigation computer system that is particularly useful for HA/HO jumps, although this is not a limitation of use of the present invention. As illustrated in FIG. 1, the navigational computer 10 is preferably small enough such that it may be attached to the helmet 331 of the parachutist 30. This embodiment is preferably since it minimizes the amount of wires/cables. Alternatively, the navigational computer 10 may be mounted anywhere else on the parachutist 30 such as, but not limited to, the jumping harness 20 or leg 332 of the parachutist 30 or on the jumping harness 20. An attachment mechanism (such as, but not limited to, a hooks-and-loop strap or pocket), allows adjustable positioning of the navigational computer 10 to the jumping harness 20 or any part of the jumpers jumpsuit that is comfortable and out of the way of critical handles of the parachute system.

The navigational computer 10 has a display, as discussed more fully below, with all necessary information to maneuver and reach the target 3. The display receives a signal from the navigational computer 10. The jumper does not need to change any controls while in flight in order to operate the navigational computer 10. Other configurations of the navigational computer 10 are possible. For example, a head mounted display 40 is preferably used for display purposes. Thus, a different mounting system could be used with such a display. An exemplary heads up display, also termed a head mounted display (HMD), that may be used with the present invention is a display based on the SO-35 Land Warrior head mounted display developed by Rockwell Collins and Kaiser Electrode-Optics.

The navigational computer 10 receives positional information 50, such as GPS information, from an orbiting satellite or other similar device 60. The navigational computer 10 is programmed to perform advanced auto-pilot guidance, automatically scaling maps and satellite imagery, way point tracking, team member tracking, alternative target designations, cone of acceptability based on the wind data, as well is the ability to transition to advanced ground-based functions after landing.

Additional features that may be performed by the navigational computer 10 include dynamically created, wireless, self-healing, ad-hoc mesh networks for the automatic creation of peer-to-peer linking of multiple team members. The peer-to-peer linking allows implementation of key features to the GUI (graphical user interface) such as allowing team members to see each other's location throughout flight and after landing. The peer-to-peer linking also enables a single base station computer (such as a laptop) to simultaneously perform and upload Mission planning on multiple systems and to provide real-time tracking of the telemetry of each team member.

The peer-to-peer network typically has a range of approximately 60 miles between units using 1 watt, spread spectrum 900 mHz transceivers. The network will be dynamically created, wireless and self-healing. The network will provide very quick network discovery and synchronization, time domain multiplexing to avoid network collisions, package based communication with 32 bit CRC checks some and allow up to 240 unique transmitters and an infinite number of receivers. Other protocols may be used.

Figure 2:
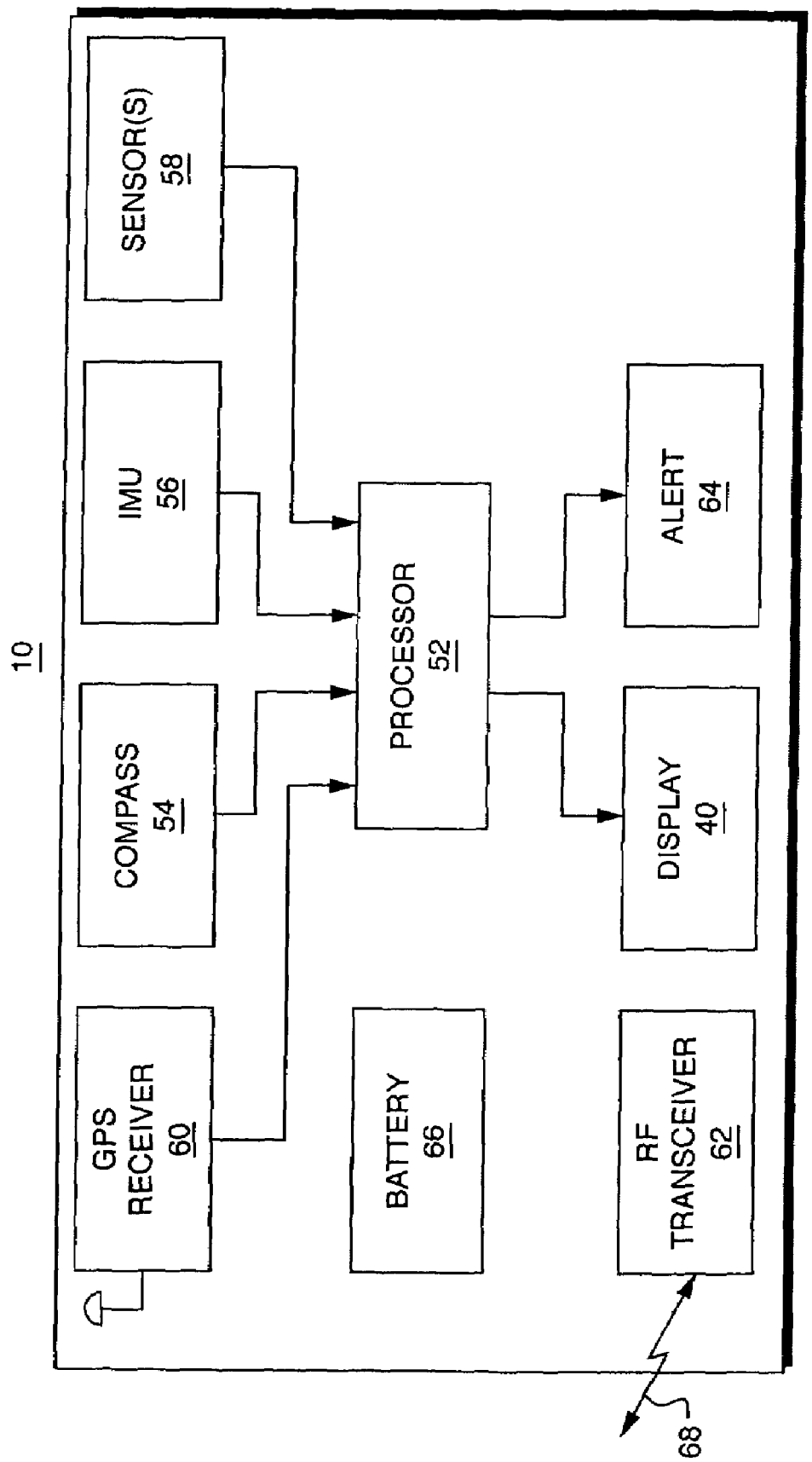
FIG. 2 is an oblique view of a navigational computer according to an embodiment of the present invention without the cover.

The navigational computer 10, FIG. 2, includes a number of functional elements including a processor or central processing unit 52. The central processing unit (CPU) 52 includes necessary components such as random access memory, EEPROM, and optional compact Flash card. Of course, other components could be included in the computer. The computer includes appropriate software to perform the functions set forth below.

The central processing unit 52 of the navigational computer 10 receives as input, information from various elements including, but not limited to, a GPS receiver 60, a compass 54 and/or inertial measurement unit (IMU) 56 (comprising generally of three accelerometers, three rate gyros, and three magnetometers) and one or more sensors 58 such as a pressure sensor. An RF transceiver 62 is also provided for the peer-to-peer networking. A display 40 is also provided. In addition, the central processing unit 52 may provide an alert 64 such as a flashing light or audible alarm based on flight conditions such as being off target or venturing to close to a team member during descent.

According to an embodiment of the invention, the navigational computer 10 includes an RF transceiver 62 for communications between other units in the air or on the ground. Multiple navigational computers 10, each with an RF transceiver 62, are linked in a peer-to-peer network. In this manner, information can be shared between computers. For example, the location of other jumpers in the team can be automatically transmitted over the network to the navigational computer. Distances and locations of jumpers can be included as blips on the compass section of the display. Thus, the team may control flight paths for coordinated operation. Furthermore, communications mechanisms, such as text or voice, can be used over the network to allow coordinated efforts.

With the RF transceiver 62 and network 68, the navigational computer 10 may also be used for coordination of team operations on the ground. Thus, the navigational computer of the present invention has ongoing utility in the mission after completion of the flight. The preferred embodiment includes a 900 mhz or 1.3 ghz, 1 watt spread spectrum rf transceiver running a masterless TDMA peer-to-peer protocol, although other protocols and frequency/powers may be used. Once on the ground, the system's wireless peer-to-peer network enables the units to transition to a useful ground function. The systems will function as an advanced ground based GPS system enabling team members to visualize each other's position on the display and communicate. The use of true peer-to-peer vs. various master slave-networking protocols ensures the network isn't vulnerable to failing upon losing any of the units.

Figure 3:
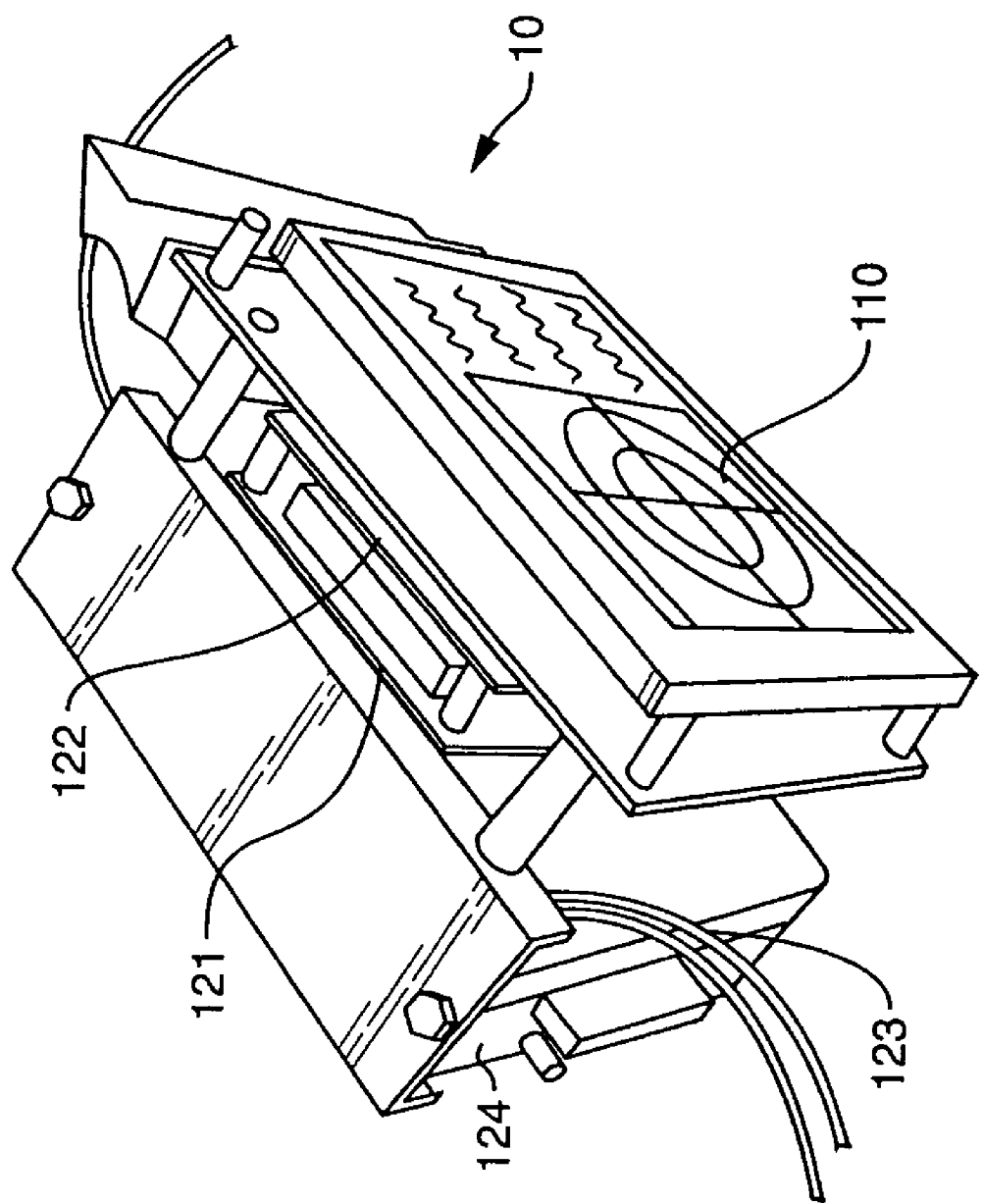
FIG. 3 is a front view of a display of a navigational computer according to an embodiment of the present invention.

FIG. 3 illustrates one embodiment of the components of the navigational computer 10 in accordance with the present invention. The navigational computer 10 includes a head mounted or other display 40 which can operate at the temperatures and altitudes for HA/HO jumps. It also includes a number of circuit boards 121, 122, 123, 124 with the necessary processing hardware to perform the navigational operations described herein.

According to one embodiment of the invention, the navigational computer 10 includes a computer having a central processing unit (CPU), random access memory, EEPROM, and optional compact Flash card. Of course, other components could be included in the computer, or components could be placed on different circuit boards. The computer includes appropriate software to perform the functions set forth below. Furthermore, the navigational computer 10 includes a GPS receiver, a compass or optional inertial measurement unit, and a pressure sensor.

The navigational computer 10 is powered by a DC battery pack 66 which can provide hours of capacity at the operating temperatures and altitudes of the system. The system components are selected to operate at temperatures ranging from approximately −50° C. to approximately +85° C., and at altitudes up to approximately 35,000 feet. Thus, the navigational computer will operate in the extreme conditions of HA/HO jumps.

According to an embodiment of the invention, the entire unit is approximate 4.25 inches tall, 6 inches wide, and 2 inches deep. Of course, any other dimensions could be used. In the preferred embodiment, the entire unit is small enough to allow it to be head mounted. The navigational computer 10 also includes inputs and outputs for programming, providing data, or retrieving data relative to the mission.

Figure 4A:
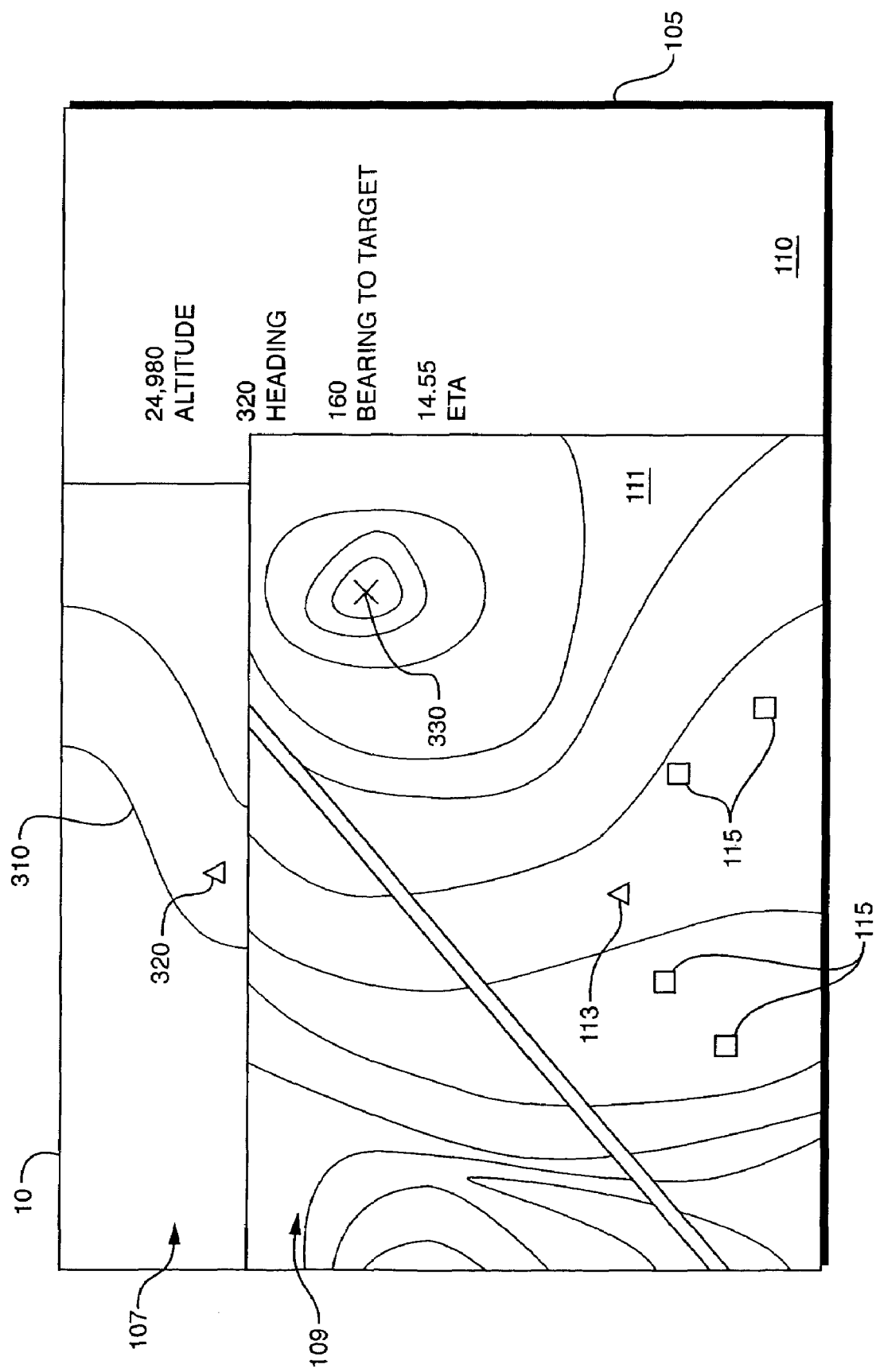
FIG. 4A is a front view of a display of a navigational computer having a satellite image according to one embodiment of the present invention.

FIG. 4 illustrates an embodiment of a display 110 of the navigational computer 10. The display 110, FIG. 4A, preferably includes a first window 109 displaying a map 111 or the like (preferably a satellite map). The use of a satellite map 111 provides the user with much more information regarding his/her exact position 113 as well as the terrain. Additionally, the satellite map 111 greatly enhances the user's ability to make decisions in the event a different landing spot or flight path is needed once the jump has begun by providing the user with valuable information of the terrain. The satellite map 111 may also show the position of other team members 115.

According to the preferred embodiment of the present invention, the display 110 is self-centering such that the user does not need to orientate the display 110 and the display 110 is always pointed in the correct direction relative to the user's flight path or even orientation of the user's head. The self-centering feature greatly reduces the likelihood of the parachutist becoming disorientated during the descent.

The display 110 preferably includes a second window 107 showing at least a partial, navigational "roadmap", flight path, or look-ahead path 310. The navigational "roadmap" 310 utilizes look ahead navigational capabilities to indicate to the jumper his or her travel path 310 given the current direction of travel and also providing a "path" 310 on which the jumper may "steer" to navigate to the proper target location 330. This feature allows the user to see his/her exact, current location 320 as well as see and anticipate any turns in advance, greatly reducing user fatigue and stress during a descent. Rather than simply providing immediate instructions (e.g., turn 30 degrees now), the look-ahead flight path 310 allows the user 320 to see not only where he/she is, but also where he/she is going. The feature looks similar to a driving-type video game where a player must steer right or left to keep their car in the center of the road, with a slight amount of the road visible in the distance. As parafoils basically have a set glider ratio (which can be varied not greatly), the autopilot graphical highway need not be truly three-dimensional but rather two-dimensional, providing look ahead for only right and left required inputs.

Because the user 320 can see and anticipate the flight path 310, the user 320 need only control the parachute to line up the arrows or follow the "highway" 310. Consequently, the overall accuracy of the landing is increased and stress of the user reduced. This feature is also particularly useful when used with a satellite map 111 as discussed above. Although shown in two different windows 107, 109, the roadmap 310 may be overlaid on the satellite map 111. It should be noted, however, that the look-ahead feature may also be used with a standard compass-based system as shown in FIG. 4B.

As this product is intended for use by many different military divisions, the software will allow minor customization of the GUI of the display 110 to best meet the needs of different users. For example, mission planning can set the exact features and look of the GUI from a menu of various options. In addition to the self scaling map, more skillful operators will likely choose to have additional information displayed in a third window 105, such as, but not limited to, altitude, waypoint tracking and autopilot highway, glider ratio, ETA, heading and bearing to target, and team member locations. A lower skill jumper may opt to have the minimum required information displayed so as to reduce the likelihood of confusion.

The display 110 includes all of the necessary information for proper completion of the jump at one time. According to one embodiment, a self-scaling and orienting map is displayed along with the altitude, a superimposed trace of ones flight path, and an autopilot highway.

Figure 4B:
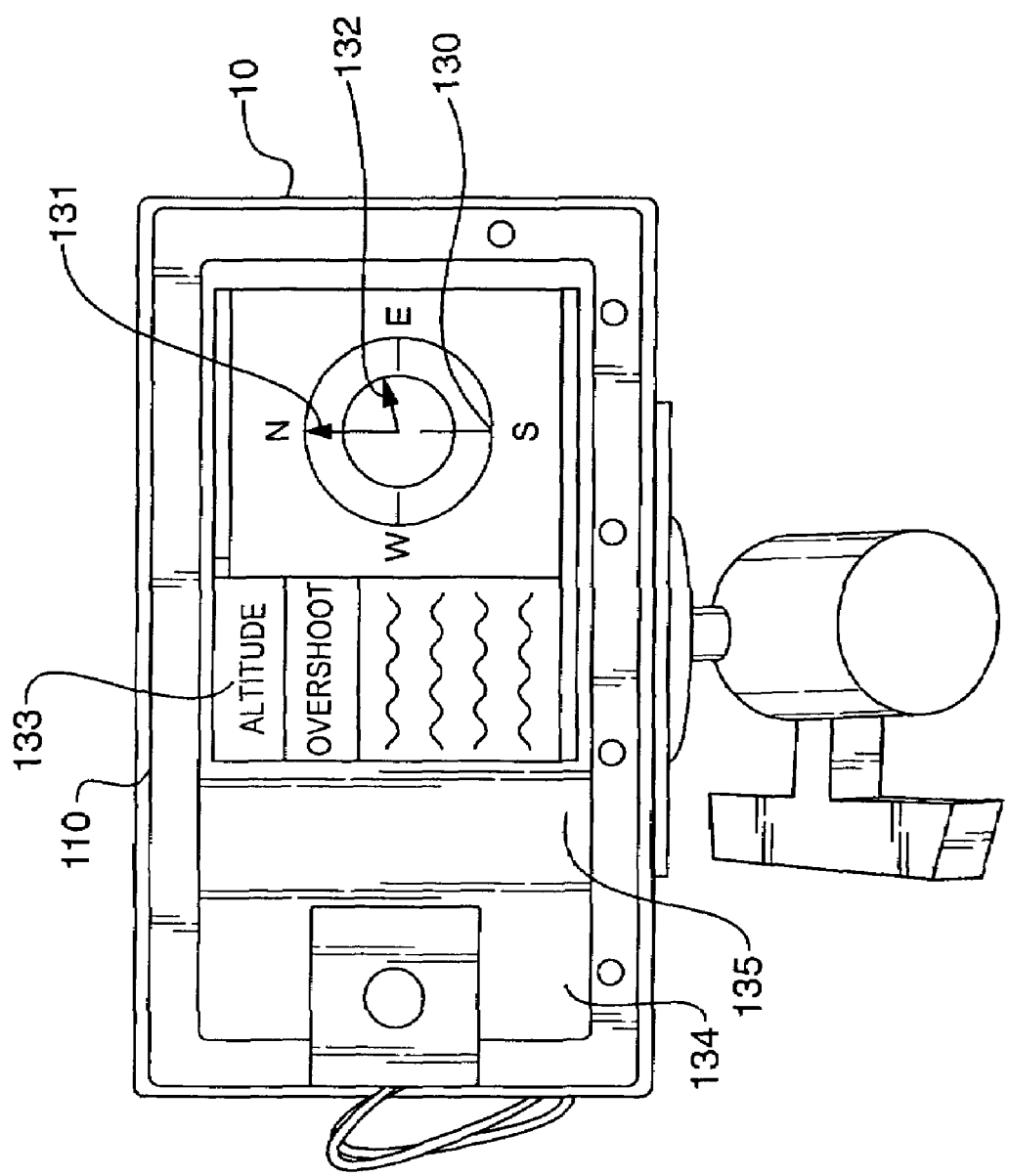
FIG. 4B is a front view of a display of a navigational computer having a compassed based image according to another embodiment of the present invention.

Referring specifically to FIG. 4B, the display 110 may also include status information on the flight, such as current altitude 122 and overshoot/undershoot 134, i.e., a determination of the landing location relative to the target location (how many feet long or short you would land if flying straight line to target at current glide ratio). Other information may also be provided in various areas 135 of the display, such as glide ratio, estimated time to landing, heading and bearing to target.

The navigational computer 10 is programmed to determine the information to be displayed. In this regard, the target location is programmed into the computer. The GPS system is used to determine the current location of the jumper. The GPS system and/or the pressure sensor may also be used to determine the altitude of the jumper (algorithms are included to calibrate the barometric sensor off the GPS when the accuracy is high enough, when the dilution of precision of the GPS drops due to too few satellites in view the system switched to barometric altitude). Additionally, the navigational computer 10 includes a compass/inertial navigation sensor, which can be used to backup the GPS system or to provide information in the event of loss of or spoofing of the GPS signal. Based upon the position and altitude over time, as determined by the GPS system, pressure sensor, and/or the inertial navigation sensor, the computer calculates the current heading, bearing to target, glide ratio, velocity (in various directions), speed over ground, course over ground, estimated time to target, and target overshoot or undershoot. This information is feed in to the guidance algorithms to continuously calculate an auto pilot flight path to be displayed by the GUI and is displayed to the jumper for appropriate flight control. The system can optionally be provided with motors (not shown) to control the flight of the parachutist automatically. This embodiment may be used, for example, as a backup in the event that the parachutist is unable to control the parachute (e.g., due to injury or unconsciousness).

The system may also be used for data logging. A compact Flash memory may be used to store the calculated information for future review of the mission. Additionally other sensors may be included and datalogged. Constructed units have an 8 channel 16 bit a/d converter, wherein channel 1 is being used by the barometric pressure sensor, leaving 7 channels open for connection to other desired sensors, i.e. chemical weapons sensors and the like. Third-party sensors can be integrated with the navigational computer. Discrete messages could be communicated to and from the navigational computer and these messages can then be transmitted to either the entire network or to individual units in the network. The protocol for this communication may be customized, field upgraded, and encrypted.

According to one embodiment of the invention, calculations are performed using double precision arithmetic. Distance and azimuth are calculated using inverse. The default coordinate system is WGS-84. Of course, other processes, datums, and spheroids may be used. As mentioned above, the present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the following claims.

What is claimed is:

1. A navigational computer, comprising:
   a display device wherein said display device is a head mounted display;
   a plurality of navigational devices, each of said plurality of navigational devices providing a navigational signal;
   a central processing unit, responsive to said plurality of navigational signals, for processing said plurality of navigational signals and for providing navigational display information to said display device; and
   a peer-to-peer network link, for establishing peer-to-peer communications with at least one other navigational computer, for providing said navigational information to said at least one other navigational computer, and for receiving and displaying navigational information received from said at least one other navigational computer.

2. The navigational computer of claim 1 wherein said plurality of navigational devices are selected from the group consisting of a GPS, a compass, and inertial measurement unit and a pressure sensor.

3. The navigational computer of claim 1 wherein said navigational information includes positional information.

4. The navigational computer of claim 1 wherein said navigational information includes look ahead flight path information giving the user an autopilot flight path to navigate to a desired destination.

5. The navigational computer of claim 1, further including an alert device, responsive to said navigational information, for providing an alert to a user.

6. The navigational computer of claim 5 wherein said alert is a visual alert.

7. The navigational computer of claim 5 wherein said alert is an audible alert.

8. The navigational computer of claim 1 wherein said navigational display information includes a map image.

9. A navigational computer for a parachute, comprising:
   a display device providing output to an operator of the parachute;
   a plurality of navigational devices, each of said plurality of navigational devices providing a navigational signal;
   a central processing unit, responsive to said plurality of navigational signals, for processing said plurality of navigational signals and for providing navigational display information to said display device; and
   a peer-to-peer network link, for establishing peer-to-peer communications with at least one other navigational computer, for providing said navigational information to said at least one other navigational computer, and for receiving and displaying navigational information received from said at least one other navigational computer.

10. The navigational computer of claim 9 further comprises,
    an input device providing input from the operator of the parachute.

11. The navigational computer of claim 9 wherein said display device is a head mounted display.

12. The navigational computer of claim 9 wherein said navigational information includes positional information.

13. The navigational computer of claim 9 wherein said navigational information includes look ahead flight path information giving the user an autopilot flight path to navigate to a desired destination.

14. The navigational computer of claim 9, further including an alert device, responsive to said navigational information, for providing an alert to a user.

15. The navigational computer of claim 9 wherein said navigational display information includes a map image.

* * * * *